United States Patent
Schultz et al.

(10) Patent No.: US 10,587,705 B2
(45) Date of Patent: Mar. 10, 2020

(54) METHODS AND SYSTEMS FOR DETERMINING USE AND CONTENT OF PYMK BASED ON VALUE MODEL

(71) Applicant: Facebook, Inc., Menlo Park, CA (US)

(72) Inventors: Alexander Paul Schultz, San Francisco, CA (US); Brian Piepgrass, Mountain View, CA (US); Ching-Chih Weng, Fremont, CA (US); Daniel Ferrante, Redwood City, CA (US); Deeptanshu Verma, Sunnyvale, CA (US); Peter Martinazzi, San Francisco, CA (US); Thomas Alison, Palo Alto, CA (US); Ziqing Mao, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 530 days.

(21) Appl. No.: 13/659,695

(22) Filed: Oct. 24, 2012

(65) Prior Publication Data

US 2014/0114774 A1 Apr. 24, 2014

(51) Int. Cl.
*H04L 29/08* (2006.01)
*G06Q 30/02* (2012.01)
(Continued)

(52) U.S. Cl.
CPC ............ *H04L 67/22* (2013.01); *G06Q 10/10* (2013.01); *G06Q 30/02* (2013.01); *G06Q 30/0277* (2013.01); *G06Q 50/01* (2013.01)

(58) Field of Classification Search
CPC .... G06Q 30/0277; G06Q 10/10; G06Q 30/02; G06Q 50/01; H04L 67/22
See application file for complete search history.

(56) References Cited

U.S. PATENT DOCUMENTS 8,521,661 B2   8/2013  Wang et al.
8,744,976 B2   6/2014  Jagadish
(Continued)

FOREIGN PATENT DOCUMENTS

CN   101770459 A   7/2010
CN   102035891 A   4/2011
(Continued)

OTHER PUBLICATIONS

Gao et al., "A Directed Recommendation Algorithm for User Requests based on Social Networks" (published in 2011 IFIP 9th International Conference on Embedded and Ubiquitous Computing, pp. 457-462, Oct. 1, 2011) (Year: 2011).*

(Continued)

*Primary Examiner* — James M Detweiler
*Assistant Examiner* — Patrick Kim
(74) *Attorney, Agent, or Firm* — FisherBroyles, LLP

(57) ABSTRACT

Techniques introduced here include a system and method for determining whether to provide a user of a social networking system with candidate users (i.e., potential contacts) with whom the user does not already have any connections with. In some embodiments, the system generates a set of candidate users based on a value (e.g., to the social networking system) associated with each potential connection formed between the user and the set of candidate users. In one or more embodiments, the system ranks the candidate users based on their connection-value to the social networking system and provides the ranked candidate users as suggested new connections to the user.

17 Claims, 7 Drawing Sheets

(51) Int. Cl.
 *G06Q 50/00* (2012.01)
 *G06Q 10/10* (2012.01)

(56) References Cited

U.S. PATENT DOCUMENTS

| | | | |
|---|---|---|---|
| 2007/0143172 | A1 | 6/2007 | Bhagchandani et al. |
| 2008/0040428 | A1 | 2/2008 | Wei et al. |
| 2008/0040475 | A1 | 2/2008 | Bosworth |
| 2008/0134053 | A1* | 6/2008 | Fischer ............... G06Q 10/02 715/747 |
| 2008/0279419 | A1 | 11/2008 | Kluesing et al. |
| 2008/0294589 | A1 | 11/2008 | Chu et al. |
| 2009/0228513 | A1 | 9/2009 | Tian |
| 2009/0271370 | A1* | 10/2009 | Jagadish ............... G06Q 10/10 |
| 2009/0271379 | A1 | 10/2009 | Bakalash et al. |
| 2010/0057858 | A1 | 3/2010 | Shen et al. |
| 2010/0281035 | A1* | 11/2010 | Carmel ............... G06F 16/951 707/749 |
| 2011/0113086 | A1 | 5/2011 | Long |
| 2012/0041907 | A1 | 2/2012 | Wang |
| 2012/0166578 | A1 | 6/2012 | Hong |
| 2014/0114774 | A1 | 4/2014 | Schultz et al. |
| 2018/0247379 | A1 | 8/2018 | Chu |

FOREIGN PATENT DOCUMENTS

| | | |
|---|---|---|
| CN | 102316046 A | 1/2012 |
| CN | 102467542 A | 5/2012 |
| CN | 102739812 A | 10/2012 |
| EP | 2323345 A1 | 5/2011 |
| JP | 2003316930 A | 11/2003 |
| JP | 2009146314 A | 7/2009 |
| JP | 2012519335 A | 8/2012 |
| JP | 2012168896 A | 9/2012 |
| KR | 2010-0130003 | 12/2010 |
| KR | 10-2011-0085853 A | 7/2011 |
| WO | 2010/099631 A1 | 9/2010 |

OTHER PUBLICATIONS

Extended European Search Report for European Application No. 13189685.4, dated Nov. 29, 2013, 7 pages.
International Search Report and Written Opinion of International Application No. PCT/US2013/066462, dated Feb. 14, 2014, 12 pages.
Morris, B., et al., "Virtual Reality Finally Catches On-With Businesses," Wall Street Journal, Jun. 5, 2017, 3 pages.
Notice from the European Patent Office dated Oct. 1, 2007 concerning business methods, Journal of the European Patent Office, vol. 30, No. 11, pp. 592-593 (dated Nov. 1. 2007).
Charikar, C. et al., "Finding Frequent Items in Data Streams", ACM, Springer-Verlag, Proceedings of the 29th International Colloquium on Automata, Languages and Programming, 2002, pp. 693-703.
Koren, "Collaborative Filtering with Temporal Dynamics", ACM Proceedings of the 15th ACM SIGKDD International Conference on Knowledge Discovery and Data Mining, 2009, pp. 447-455.
Lu, S. et al., "Supervised Link Prediction Using Multiple Sources", Data Mining (ICDM), 2010 IEEE 10th International Conference on Dec. 13-17, 2010, 17 pages.
Song, C. et al., "Scalable Proximity Estimation and Link Prediction in Online Social Networks", ACM, Proceedings of the 9th ACM SIGCOMM conference on Internet Measurement Conference, 2009, pp. 322-335.
Notification of reasons for Refusal for Japanese Patent Application No. 2015-539767 of Facebook Inc. dated Sep. 19, 2017, 7 pages.
Office Action for Mexican Patent Application No. MX/a/2015/005305, dated Apr. 18, 2017, 9 pages.
First Office Action for Chinese Patent Application No. 2013800559565 of Facebook, Inc., dated Jun. 20, 2017, 39 pages.
Preliminary Office Action for Israel Patent Application No. 238342, dated May 1, 2017, 5 pages.
Second Office Action for Mexican Patent Application No. MX/a/2015/005305 of Facebook, Inc. dated Aug. 22, 2017, 8 pages.
First Office Action for European Application No. 13189685.4, dated Mar. 2, 2016, 7 pages.
U.S. Appl. No. 15/442,597 of Chu, C., et al., filed Feb. 24, 2017, 55 pages.
Third Office Action for Mexican Patent Application No. MX/a/2015/005305 of Facebook, Inc. dated Feb. 27, 2018, 9 pages.
Fourth Office Action for Mexican Patent Application No. MX/a/2015/005305 of Facebook, Inc. dated Aug. 28, 2018, 9 pages.
Second Office Action for Chinese Patent Application No. 2013800559565 of Facebook, Inc. dated Apr. 24, 2018, 13 pages.
Examination Report No. 1 for Australian Patent Application No. 2013334638 of Facebook, Inc. dated Oct. 16, 2018, 4 pages.
Decision of Rejection for Chinese Patent Application No. 2013800559565 of Facebook, Inc. dated Oct. 24, 2018, 10 pages.
Second Office Action for Israel Patent Application No. 238342, dated Mar. 28, 2018, 21 pages.
International Preliminary Report on Patentability for International Application No. PCT/US2013/066462, dated May 7, 2015, 9 pages.
Notice of Reexamination received for Chinese Patent Application Serial No. 201380055956.5 dated Sep. 5, 2019, 31 pages (Including English Translation).
Examination Report No. 2 received for Australian Patent Application Serial No. 2013334638 dated Mar. 8, 2019, 3 pages.
First Office Action received for Canadian Patent Application Serial No. 2,887,932 dated Aug. 22, 2019, 4 pages.
Notification of Reason for Refusal received for Korean Patent Application Serial No. 10-2015-7010818 dated Dec. 27, 2019, 24 pages (Including English Translation).
Examination Report No. 2 received for Australian Patent Application Serial No. 2013334638 dated Dec. 10, 2019, 3 pages.

* cited by examiner

| User Group # | User Group | Sending Score | Receiving Score |
|---|---|---|---|
| 1 | fc<=6 | 44 | 49 |
| 2 | fc<=30 and not in user group 1 | 13 | 45 |
| 3 | tenure<=1yr and not in user group 1, 2 | 1.7 | 12 |
| 4 | tenure<=2yr and not in user group 1, 2, 3 | 1.3 | 3 |
| 5 | tenure>2yr and not in user group 1, 2, 3, 4 | 0 | 0.3 |

METHODS AND SYSTEMS FOR DETERMINING USE AND CONTENT OF PYMK BASED ON VALUE MODEL

FIELD

This invention relates generally to social networking systems, and more particularly to providing suggestions to users regarding potential connections within a social networking system.

BACKGROUND

Users of social networking services may form connections, associations, or other relationships with other users based on real-life interactions, online interactions, or a wide variety of other bases. For example, users may choose to connect with others who are in the same geographic location, who have a common circle of friends, who have attended the same college or university, etc. Social networking systems value user connections because better-connected users tend to increase their use of the social networking system, thus increasing user-engagement and corresponding increase in, for example, advertising opportunities. Accordingly, it is generally desirable that users have opportunities to increase the strength and numbers of their connections within the social networking system.

Without doing a specific search for a user, it is a common challenge for users to locate other users with whom they may wish to form a connection. Existing social networking systems provide limited mechanisms for finding such connections. In some instances, for example, social networking systems provide individuals with access to an introduction mechanism. The introduction mechanism may be as simple as showing the profiles of matched individuals through listings or social network visualizations, or through context-aware match alerts and introduction management tools that aim to encourage interpersonal contact. Examples of social matching applications include a commercially available system that matches users based on location and also looks for mutual acquaintances for introduction and another commercially available system that uses social-tie data to recommend people to each other.

SUMMARY

The techniques presented herein allow for a user to make meaningful and efficient connections with new contacts. In some embodiments, for example, new connections are suggested based on the value of the connection to the social networking platform. In various embodiments, suggestions of new connections are provided to a user in a certain portion of an interface, such as a portion of a web page that contains other content. Alternatively, the suggestions may be provided in response to an action by the user. For example, suggestions may be provided in response to submission of a search query, accepting or sending a connection request, liking or commenting on an item, posting or answering a question on a social network, etc.

In one embodiment, the social networking system suggests a connection to a user based on the relevancy of providing the user information regarding a candidate user. In one example, such a connection methodology includes computing a friendship value between the user and the candidate user. The friendship value between the user and the candidate user may be determined, for example, based on a computed value of the friendship to the user, a value of the friendship to the candidate user, and a probability that a friendship or connection would be established between the user and the candidate user. In some embodiments, such a connection methodology can include computing a potential change in engagement of the user with the social network based on a successful friendship with the candidate user. Such a change in engagement may be determined based on the computed friendship value between the user and the candidate user.

This Summary is provided to introduce a selection of concepts in a simplified form that are further described in the Detailed Description and drawings. This Summary is not intended to identify essential features of the claimed subject matter or to limit the scope of the claimed subject matter.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 5 illustrates the sending and receiving scores for one or more user groups of a social networking system, in accordance with an embodiment of the invention;

DETAILED DESCRIPTION

Configuration Overview

Figure 1:
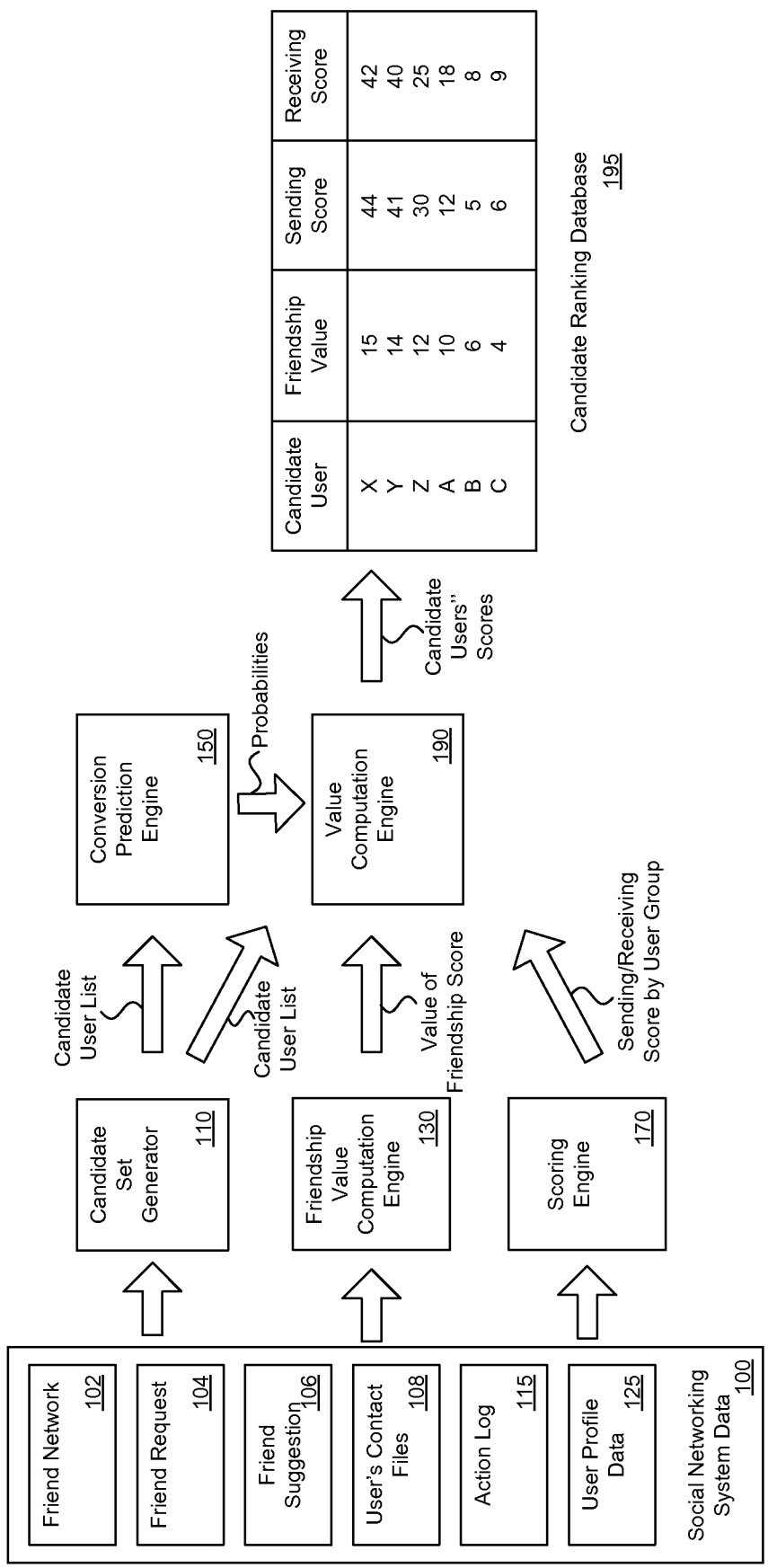
FIG. 1 illustrates a system for ranking users based on the value of a connection between two users within the social networking system to the social networking system, in accordance with an embodiment of the invention.

Social networking systems typically offer users the ability to communicate and interact with other users of the social networking system. The users of social networking systems may form connections, associations, or other relationships with other users based on real-life interactions, online interactions, or a wide variety of other bases. Mechanisms for suggesting connections are often provided by the social networking systems. However, these traditional mechanisms often have shortcomings that need to be addressed. For example, the traditional mechanisms do not estimate or determine a value of the resulting connections to the social networking system.

One example of a traditional mechanism for suggesting connections within social networking systems includes determining a number of common connections between two users and making an introduction to the two users when the number reaches a threshold. One drawback with such an approach is that the system will likely be skewed toward making more suggestions to users who already have many connections than for users with few connections within the social networking system. This leads to a sub-optimal result for the social networking system since an additional friend for a user with many friends is less valuable than an additional friend for a user with relatively few friends. Other traditional mechanisms for suggesting connections focus on simply adding connections among users without regard to the result of the suggested connections. Accordingly, existing mechanisms that suggest new connections to a user based merely on indicators of a likely connection fail to address the value of the resulting connections to the social networking system.

In contrast, various embodiments of the present invention provide for systems and methods for the social networking system to suggest a connection to a user based on the relevancy of providing the user information regarding a candidate user (i.e., potential contacts or potential friends). These techniques can include computing a friendship value between the user and the candidate user. The friendship value between the user and the candidate user may be determined, for example, based on a computed value of the friendship to the user, a value of the friendship to the candidate user, and a probability that a friendship or connection would be established between the user and the candidate user. In some embodiments, such a connection methodology can include computing a potential change in engagement of the user with the social network based on a successful friendship with the candidate user. Such a change in engagement may be determined based on the computed friendship value between the user and the candidate user.

As used herein, a "user" can be an individual or an entity (such as a business or third party application). The term "connection" refers individuals and entities with which a user of the social networking service may form a connection, association, or other relationship. In use, users join the social networking system and then connect with other users, individuals, and entities with whom they desire to be connected. Additionally, social networking systems provide various communication channels for users to interact with each other within the system. Thus, users of a social networking system may interact with each other by "posting" content items of various types of media through the communication channels. As users increase their interactions with each other within the social networking system, they engage with the social networking system on a more frequent basis. One method to increase user engagement with the social networking system is to facilitate an increase in user connections within a social networking system such that additional connections are valuable to the social networking system.

FIG. 1 illustrates a system for ranking candidate users for a user of a social network based on the value of each friendship (i.e., connection) between the user and the candidate users to the social networking system. The ranking can then be used to determine whether to show any of the candidate users to the user, an advertising unit to the user, a design graphic to increase aesthetics, profiles of connections of the user to encourage engagement, or something else to the user that will provide the more value to the social network. In some embodiments, the ranking can also be used to determine which, if any, of the candidate users will be shown to the user.

As illustrated in FIG. 1, the system can include a user's social networking system data 100, a candidate set generator 110, a friendship value computation engine 130, a conversion prediction engine 150, a scoring engine 170, a value computation engine 190, and a database of expected value rankings 195 assigned to each candidate user associated with the user. A list of candidate users not associated with the user is generated by the candidate set generator 110 by accessing data within the social networking system data 100. The friendship value computation engine 130 generates friendship values for various user groups within the social networking system by accessing data within the social networking system data 100. In accordance with various embodiments, the user groups are subsets of the users within the social networking system that have similar properties or characteristics (e.g., the number of times the users have utilized the social network within a given time frame).

The conversion prediction engine 150 receives the list of candidate users from the candidate set generator 110 and determines a probability of a connection resulting between the user and the candidate users. The scoring engine 170 generates sending and receiving scores for the various user groups within the social networking system by accessing data within the social networking system data 100. The sending and receiving scores for the various user groups generated by the scoring engine 170 can then be applied to the user (e.g., by determining which user group the user most closely matches).

The value computation engine 190 receives the list of candidates, the friendship values, and scores of the various user groups and determines the value to the social networking system for each connection between the user and each candidate user. In accordance with some embodiments, the value to the social networking system for each connection is provided in the form of a friendship value, a sending score, and a receiving score. The friendship value reflects the potential increase in overall engagement of the user with the social networking system due to a given connection. On the other hand, the sending and receiving scores reflect the potential increase in the user's continued active utilization of the social networking system due to a given connection. Each candidate user is subsequently ranked in a database 195 based on each contact's friendship value, their sending score, their receiving score, or any combination of scores.

In one embodiment, the system may provide the user with suggested connection information only when there is at least one candidate user with a friendship value greater than a specific threshold friendship value. In some embodiments, only candidate users with a friendship value greater than the specific threshold friendship value are ranked. The candidate users with the highest ranks can then be displayed to the user as suggested connections the user may know, either within or outside the social network.

In one embodiment, a user's social networking system data 100 comprises the user's friend network 102, friend request data 104, friend suggestion data 106, and the user's contact files 108. A friend network 102 can include the names and associated information of all the users who have formed a connection with the user. For example, if a user has accepted the first user's friend request, the two users have formed a connection or a friendship within the social networking system. Each user's name would appear on the other's friend network. The friend request data 104 can include the names and associated information of users who have requested that the user add the users to the first user's friend network 102.

The friend suggestion data 106 can include name and associated information of users who are suggested as friends by other friends of the user, mutual friends of the users, or by the social networking system. The user's contact files 108 can include the name and associated information of all the users within the social networking system that the user has communicated with, either through email, instant messaging, text messaging, or wall posts within the social network.

These are just a few examples of the interactions that a user can engage in within the social networking system. Many others are possible, and described in greater detail below.

In one embodiment, a user's social networking system data 100 further comprises historical social networking system usage data as action logs 115 and user profile data 125 of all the users of the social networking system. In accordance with various embodiments of the present invention, a social network system action log 115 can include usage information associated with each of the users of the social network system. For example, action log 115 associated with a given user could include information such as the number of times a user has utilized the social network within a given time frame, number of connection (i.e., friendship) requests sent/received by a user, number of connection requests of a user accepted by other users, etc. that were captured over various time points. A user profile data 125 comprises information regarding a user's account. For example, user profile data 125 could include information such as number of connections (i.e., friends) a user had within a given time frame, number of content posts a given user has within the given time frame, etc.

In some embodiments, the candidate set generator 110 generates a list of candidate users by accessing the data stored within the social networking system data 100. In one embodiment, the candidate set generator 110 generates a list of other users within the social networking system who have not yet formed a connection with the user but who may be associated in some way to the user. For example, the candidate set generator 110 may populate a set of users who may interact with a first user outside the social networking system but are not connected to the first user within the social networking system. In one embodiment, the candidate set generator 110 populates a first list comprising of the user's friends, users who sent a friend request to the user, users suggested as friends by other users of the social networking system, and users imported from the user's email contacts, if available. Additionally, the candidate set generator 110 may populate a set of users who are connected to the users in the first list. The candidate set generator 110 removes the names of all users from the list who are already connected to the user. Thus, the candidate list generator creates a candidate list of friends of the user's friends who are not connected to the user within the social networking system.

In other embodiments, the candidate set generator 110 generates a list of candidate users comprising friends of the user's friends who also share certain similar characteristics with the user. A list of similar characteristics may include, but is not limited to: sharing a social network, similar college or high school graduation year, checking into the social network from the same location at about the same time, etc. In another embodiment, the candidate set generator 110 generates a candidate list of users by selecting a portion of the friends of the user's friends not connected to the user by using a heuristics to narrow the field or linear-time rank algorithm to find a cutoff point to exclude the friends of the user's friends.

In one embodiment, the friendship value computation engine 130 generates a set of friendship values for various user groups within the social networking system by accessing the action log 115 and user profile data 125 within the social networking system data 100. The friendship value computation engine 130 computes a set of friendship values for various user groups within the social networking system by accessing the action log 115 and user profile store 125 within the social networking system data 100. The friendship value computation engine 130 then generates a friendship value for each of these user groups, where the value of a friendship to an individual user of a given user group is based on the friendship value of the user's user group.

In some embodiments, the friendship value computation engine 130 groups the users of the social network into one or more user groups based on each user's level of engagement with the social network at a given point of time. In one instance, a user's level of engagement with the social network can be measured by the number of days the user accessed the social network within a given time period. The friendship value computation engine 130 then generates a friendship value for each of these user groups, where the value of a friendship to a user of a given user group is based on the friendship value of the user's user group. Various embodiments for determining the friendship value for the user groups are described in greater detail in reference to FIG. 3.

The conversion prediction engine 150 receives the list of candidate users generated by the candidate set generator 110 and determines the probability associated with each candidate user forming a connection with the user within the social networking system. In one embodiment, the conversion prediction engine 150 uses historic demographic and behavioral data associated with all user connections within the social networking system to determine a probability of a connection.

In one embodiment, the scoring engine 170 generates a set of sending and receiving scores for various user groups within the social networking system by accessing the action log 115 and user profile data 125 within the social networking system data 100. These scores may be determined based on the potential increase in the user's continued active utilization of the social networking system. For example, if the user is able to connect with old friends or someone with similar interests, the social networking system would likely see a potential increase in user activity. In one embodiment, the scoring engine 170 groups the users of the social network into one or more user groups based on whether the users were shown candidate users to enable further connections between the users and the candidate users within a given period of time. The scoring engine 170 then generates a sending and receiving score for each of these user groups, where the sending and receiving score of a user of a given user group is based on the sending and receiving score of the user's user group. Various embodiments for determining the sending and receiving scores for the user groups are described in greater detail in reference to FIG. 4.

The value computation engine 190 receives the list of candidate users, the friendship values, the sending and receiving scores of the various user groups, and/or the probabilities of the user and candidate users making a connection. Using this information, value computation engine 190 can determine the value to the social networking system for each connection between the user and each candidate user. In accordance with various embodiments, the value to the social networking system for each connection may include three parts: 1) a friendship value, 2) a sending score, and 3) a receiving score.

The friendship value is the expected increase in overall engagement of the user with the social networking system that would result from the connection between the user and the candidate user. The overall engagement is a measure of the involvement or commitment of the user. This can include activities both on and off of the social networking system. For example, any activity that can be tied to social plugins, connecting, involvement, and the like can be used as indicators of the user's engagement. Engagement may be measured based on activities performed by the user on the social network, such as logins, page views, posts, comments, etc.

The sending score is the value to the user in sending a connection request to the candidate user. The value can be any perceived benefit or importance of the connection between the user and candidate user being generated. As such, when the candidate user has a high sending score, a connection between the user and the candidate user may increase both the user and candidate user's continued active utilization of the social networking system. The receiving score is the value to the candidate user in receiving a connection request from a user. As such, when the candidate user has a high receiving score, a connection between the user and the candidate user may increase both the user and candidate user's engagement with the social networking system and with other users or entities associated with the social networking system.

The value computation engine 190 outputs a list of candidate users ranked by their friendship value score, sending score, receiving score, or any combination of scores. The rankings can be stored in candidate ranking database 195 and used by the social networking system to provide numerous suggestions to the user. Embodiments of the suggestions are described in greater detail below in reference to FIG. 6. As described above, the candidate set generator 110, the friendship value computation engine 130, the conversion prediction engine 150, the scoring engine 170 and the value computation engine 190 are described in greater detail below in reference to FIGS. 2, 3, 4 and 5.

System Architecture

Figure 2:
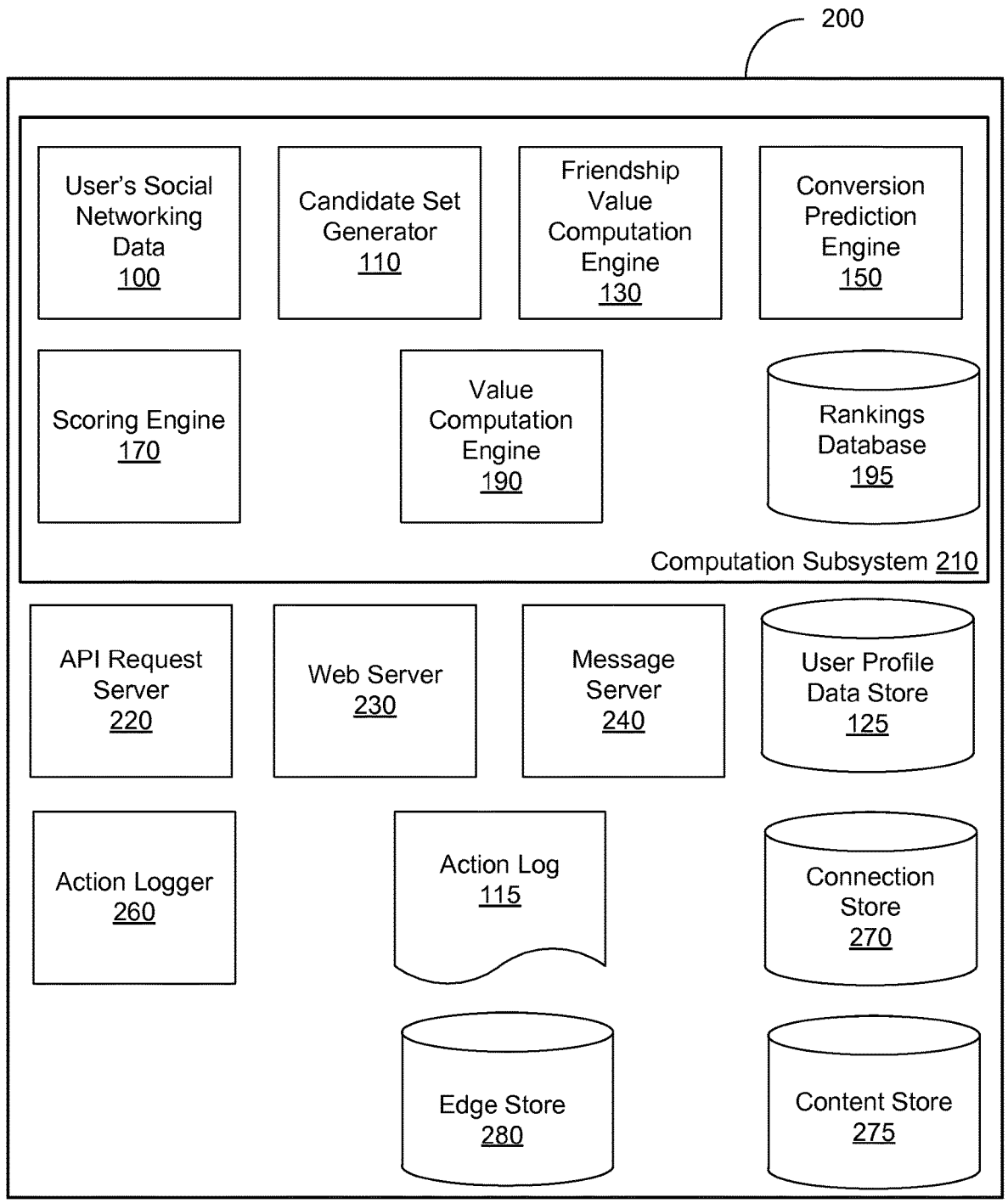
FIG. 2 is a high level block diagram of a system, in accordance with an embodiment of the invention.

FIG. 2 illustrates a block diagram of a social networking system 200 having a computation subsystem 210 that incorporates a people you may know ("PYMK") value model, in accordance with an embodiment of the invention. The computation subsystem 210 can be used for determining the ranking of candidate users and utilizing the rankings to determine whether to show any of the candidate users to the user. As illustrated in FIG. 2, the computation subsystem 210, within the social networking system 200, can include a user's social networking data 100, a candidate set generator 110, a friendship value computation engine 130, a conversion prediction engine 150, a scoring engine 170, a value computation engine 190 and a database of expected value rankings 195 assigned to each candidate user associated with a given user. While not shown in FIG. 2, social networking system 200 can also include or communicate with user devices, a financial account provider system, and/or additional components.

In some embodiments, the social networking system 200 can include one or more computing devices storing user profiles associated with users and/or other objects as well as connections between users and other users and/or objects. In use, users join the social networking system 200 and then add connections to other users or objects of the social networking system to which they desire to be connected. Users of the social networking system 200 may be individuals or entities such as businesses, organizations, universities, manufacturers. The social networking system 200 allows its users to interact with each other as well as with other objects maintained by the social networking system 200. In some embodiments, the social networking system 200 allows users to interact with third-party websites and financial account providers.

Based on stored data about users, objects and connections between users and/or objects, the social networking system 200 generates and maintains a "social graph" comprising a plurality of nodes interconnected by a plurality of edges. Each node in the social graph represents an object or user that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 200 modifies edges connecting the various nodes to reflect the interactions.

User devices that interact with social networking system 200 can be any type of computing device capable of receiving user input as well as transmitting and/or receiving data via a network. For example, the user devices can include conventional computer systems, such as a desktop or laptop computer. As another example, the user devices may include a device having computer functionality, such as a personal digital assistant (PDA), mobile telephone, smart-phone or similar device. The user devices are configured to communicate with the social networking system 200, and/or the financial account providers via a network. In one embodiment, a user device may execute an application allowing a user of the user device to interact with the social networking system 200. For example, the user device may execute a browser application to enable interaction between the user device and the social networking system 200 via a network. In another embodiment, a user device can interacts with the social networking system 200 through an application programming interface (API) that runs on the native operating system of the user device, such as IOS® or ANDROID™.

The user devices are configured to communicate via a network, which may comprise any combination of local area and/or wide area networks, using both wired and wireless communication systems. In one embodiment, the network uses standard communications technologies and/or protocols. Thus, the network may include links using technologies such as Ethernet, 802.11, worldwide interoperability for microwave access (WiMAX), 3G, 4G, CDMA, digital subscriber line (DSL), etc. Similarly, the networking protocols used on the network may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The embodiments of the social networking system 200 shown in FIG. 2 also include an application programming interface (API) request server 220, a web server 230, a message server 240, a user profile data store 125, an action logger 260, an action log 115, a connection store 270. In other embodiments, the social networking system 200 may include additional, fewer, or different modules for various applications. Conventional components such as network interfaces, security mechanisms, load balancers, failover servers, management and network operations consoles, and the like are not shown so as to not obscure the details of the system.

In some embodiments, the system 200 is not a social networking system but communicates with a social networking system to obtain the necessary social network information. As a result, the system 200 may communicate with the social networking system, for example, using APIs provided by the social networking system. In these embodiments, some modules shown in FIG. 2 may run in the system 200, whereas other modules may run in the remote social networking system. For example, the candidate set generator 110, the friendship value computation engine 130, the value computation engine 190, and others may run in the system 200 while the API request server 220, user profile data store 125, connection store 270, and the action log 115 may exist in a separate social networking system.

The social networking system 200 allows users to communicate or otherwise interact with each other and access content, as described herein. The social networking system 200 stores user profiles in the user profile data store 125. A user profile includes declarative information about the user that was explicitly shared by the user, and may also include profile information inferred by the social networking system 200. In one embodiment, a user profile includes multiple data fields, each data field describing one or more attributes of the corresponding user of the social networking system 200. The user profile information stored in user profile data store 125 describes the users of the social networking system 200, including biographic, demographic, and other types of descriptive information, such as work experience, educational history, gender, sexual preferences, hobbies, location, other preferences, and the like. The user profile may also store information provided by the user. For example, images or videos provided by the user may also be stored within the user profile. In certain embodiments, images of users may be tagged with identification information of the appropriate users whose images are displayed. A user profile in the user profile data store 125 may also maintain references to actions by the corresponding user performed on content items in a content store and stored in an edge store.

A user profile may be associated with one or more financial accounts, allowing the user profile to include data retrieved from or derived from a financial account. A user may specify one or more privacy settings, which are stored in the user profile, that limit information from a financial account that the social networking system 200 is permitted to access. For example, a privacy setting limits the social networking system 200 to accessing the transaction history of the financial account and not the current account balance. As another example, a privacy setting limits the social networking system 200 to a subset of the transaction history of the financial account, allowing the social networking system 200 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by the social networking system 200. In one embodiment, information from the financial account is stored in the user profile data store 125. In other embodiments, it may be stored in the financial account store.

The social networking system 200 further stores data describing one or more connections between different users in the connection store 270. The data describing one or more connections can include a list of connections, a date each connection (i.e., friendship) was made, etc. The connections may be further defined by users, allowing users to specify their relationships with other users. For example, the connections allow users to generate relationships with other users that parallel the users' real-life relationships, such as friends, co-workers, partners, and so forth. In one embodiment, the connection specifies a connection type based on the type of relationship. Examples of the type of relationship include family, friend, colleague, etc. Users may select from predefined types of connections, or define their own connection types as needed.

The web server 230 links the social networking system 200 via a network to one or more client devices; the web server 230 serves web pages, as well as other web-related content, such as Java, Flash, XML, and so forth. The web server 230 may communicate with the message server 240 that provides the functionality of receiving and routing messages between the social networking system 200 and client devices. The messages processed by the message server 240 can be instant messages, queued messages (e.g., email), text and SMS (short message service) messages, or any other suitable messaging technique. In some embodiments, a message sent by a user to another can be viewed by other users of the social networking system 200, for example, by the connections of the user receiving the message. An example of a type of message that can be viewed by other users of the social networking system besides the recipient of the message is a wall post. In some embodiments, a user can send a private message to another user that can only be retrieved by the other user.

When a user takes an action on the social networking system 200, the action can be recorded in an action log 115 subject to any privacy settings and restrictions. In one embodiment, the social networking system 200 maintains the action log 115 as a database of entries. When an action is taken on the social networking system 200, the social networking system 200 can add an entry for that action to the log 115. In accordance with various embodiments, the action logger 260 is capable of receiving communications from the web server 230 about user actions on and/or off the social networking system 200. The action logger 260 populates the action log 115 with information about user actions to track them. This information may be subject to privacy settings associated with the user. Any action that a particular user takes with respect to another user is associated with each user's profile, through information maintained in a database or other data repository, such as the action log 115. Such actions may include, for example, adding a connection to the other user, sending a message to the other user, reading a message from the other user, viewing content associated with the other user, attending an event posted by another user, being tagged in photos with another user, liking an entity, etc. In some embodiments, the action logger 260 receives, subject to one or more privacy settings, transaction information from a financial account associated with a user and identifies user actions from the transaction information. For example, the action logger 260 retrieves vendor identifiers from the financial account's transaction history and identifies an object, such as a page, in the social networking system associated with the vendor identifier. This allows the action logger 260 to identify a user's purchases of products or services that are associated with a page, or another object, in the content store 275. In addition, a number of actions described in connection with other objects are directed at particular users, so these actions are associated with those users as well. These actions are stored in the action log 115.

The action log 115 may be used by the social networking system 200 to track user actions on the social networking system 200, as well as external website that communicate information to the social networking system 200. Users may interact with various objects on the social networking system 200, including commenting on posts, sharing links, and checking-in to physical locations via a mobile device, accessing content items in a sequence or other interactions. Information describing these actions is stored in the action log 115. Additional examples of interactions with objects on the social networking system 200 included in the action log 115 include commenting on a photo album, communications between users, becoming a fan of a musician, adding an event to a calendar, joining a groups, becoming a fan of a brand page, creating an event, authorizing an application, using an application and engaging in a transaction. Additionally, the action log 115 records a user's interactions with advertisements on the social networking system 200 as well as other applications operating on the social networking system 200. In some embodiments, data from the action log 115 is used to infer interests or preferences of the user, augmenting the interests included in the user profile and allowing a more complete understanding of user preferences.

The action log 115 may also store user actions taken on external websites and/or determined from a financial account associated with the user. For example, an e-commerce website that primarily sells sporting equipment at bargain prices may recognize a user of a social networking system 200 through social plug-ins that enable the e-commerce website to identify the user of the social networking system 200. Because users of the social networking system 200 are uniquely identifiable, e-commerce websites, such as this sporting equipment retailer, may use the information about these users as they visit their websites. The action log 115 records data about these users, including webpage viewing histories, advertisements that were engaged, purchases made, and other patterns from shopping and buying. Actions identified by the action logger 260 from the transaction history of a financial account associated with the user allow the action log 115 to record further information about additional types of user actions.

Further, user actions that happened in particular context, such as when the user was shown or was seen accessing particular content on the social networking system 200, are captured along with the particular context and logged. For example, a particular user could be shown/not-shown information regarding candidate users every time the particular user accessed the social networking system 200 for a fixed period of time. Any actions taken by the user during this period of time are logged along with the context information (i.e., candidate users were provided/not provided to the particular user) and are recorded in the action log 115. In addition, a number of actions described below in connection with other objects are directed at particular users, so these actions are associated with those users as well.

The API request server 220 allows external systems to access information from the social networking system 200 by calling APIs. The information provided by the social network may include user profile information or the connection information of users as determined by their individual privacy settings. For example, a system interested in predicting the probability of users forming a connection within a social networking system may send an API request to the social networking system 200 via a network. The API request is received at the social networking system 200 by the API request server 220. The API request server 220 processes the request by determining the appropriate response, which is then communicated back to the requesting system via a network.

The content store 275 stores content items associated with a user profile, such as images, videos or audio files. Content items from the content store 275 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of the social networking system 200. Examples of social networking content items include suggested connections or suggestions to perform other actions, media provided to, or maintained by, the social networking system 200 (e.g., pictures or videos), status messages or links posted by users to the social networking system, events, groups, pages (e.g., representing an organization or commercial entity), and any other content provided by, or accessible via, the social networking system.

The content store 275 also includes one or more pages associated with entities having user profiles in the user profile data store 125. An entity is a non-individual user of the social networking system 200, such as a business, a vendor, an organization or a university. A page includes content associated with an entity and instructions for presenting the content to a social networking system user. For example, a page identifies content associated with the entity's user profile as well as information describing how to present the content to users viewing the brand page. Vendors may be associated with pages in the content store 275, allowing social networking system users to more easily interact with the vendor via the social networking system 200. A vendor identifier is associated with a vendor's page, allowing the social networking system 200 to identify the vendor and/or to retrieve additional information about the vendor from the user profile data store 125, the action log 115 or from any other suitable source using the vendor identifier. In some embodiments, the content store 275 may also store one or more targeting criteria associated with stored objects and identifying one or more characteristics of a user to which the object is eligible to be presented.

In one embodiment, an edge store 280 stores the information describing connections between users and other objects on the social networking system 200 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 200, such as expressing interest in a page on the social networking system, sharing a link with other users of the social networking system, and commenting on posts made by other users of the social networking system. The edge store 280 stores edge objects that include information about the edge, such as affinity scores for objects, interests, and other users. Affinity scores may be computed by the social networking system 200 over time to approximate a user's affinity for an object, interest, and other users in the social networking system 200 based on the actions performed by the user. Multiple interactions between a user and a specific object may be stored in one edge object in the edge store 280, in one embodiment. In some embodiments, connections between users may be stored in the user profile data store 125, or the user profile data store 125 may access the edge store 280 to determine connections between users.

Figure 3:
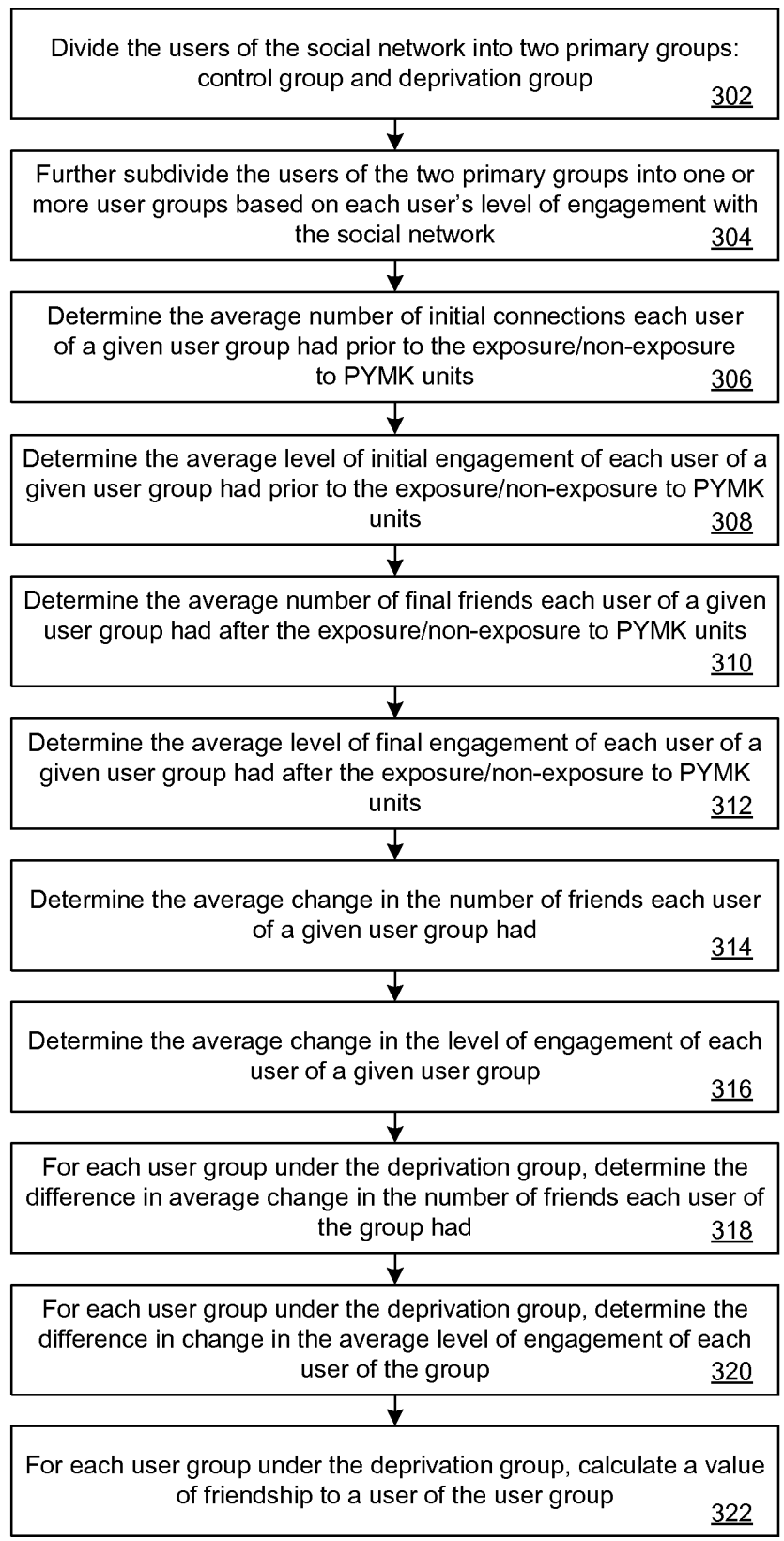
FIG. 3 is a flow chart of a process for computing a value of a friendship to a given user of a social networking system, in accordance with an embodiment of the invention.

FIG. 3 describes one method of computing a friendship score utilized by the friendship value computation engine 130 for determining the friendship value for one or more user groups. In some embodiments, a statistical analysis of a subset of the users of the social networking system is performed in order to determine the friendship value of similar users. As illustrated in step 302 of FIG. 3, the friendship value computation engine 130 utilizes the information in the action log 115 and user profile store 125 to divide a subset of users of the social network into two primary groups: (1) control group and (2) deprivation group. The users may be selected for the statistical analysis and/or divided into the two primary groups at random or selected based on characteristics to ensure an appropriate sampling of the user population (e.g., number of interactions within a certain period, number of friends, etc.).

In accordance with some embodiments, the users of the control group can be provided information regarding candidate users through a PYMK interface (or unit) suggesting new connections and may show up as a candidate user in PYMK units shown to other users. The control group may be shown the PYMK interface and presented as a candidate user for others for a predefined time period (e.g., 60 days) during their utilization of the social network. In contrast to the control group, there are three possible types of deprivation groups in which the users are deprived of PYMK units and/or being presented as a candidate user in PYMK units that are shown to other users for the predefined time period during their utilization of the social network. More specifically, a total deprivation group has users which are not provided information regarding candidate users (i.e., are not shown any PYMK units) and these users are not being presented as a candidate user in PYMK units that are shown to other users. In the second type of deprivation group, a no show deprivation group, the users are not shown PYMK units but can be presented as a candidate user in PYMK units that are shown to other users. Finally, in the third type of deprivation group, a no view deprivation group, the users are presented PYMK units but the users cannot be presented as a candidate user in any PYMK units that are shown to others users. Ultimately, the information collected from the control group and the deprivation groups can be utilized to assign values to individual users of the social networking system by the friendship value computation engine.

In step 304, for the control group and the deprivation group, the friendship value computation engine 130 further subdivides the users into one or more user groups. The division into the user groups may be based on each user's level of engagement with the social networking system 200 in some embodiments of the present invention. In one instance, the level of engagement with the social networking system 200 is measured based on number of times the user has logged into the social networking system 200 in the last X number of days (e.g., last 30 days, last 60 days, etc.). In another instance, a user's level of engagement with the social networking system 200 can be measured by the average number of hours per day the user accessed content available through the social network over a given time period.

In some embodiments, the friendship value computation engine 130 subdivides the users of each primary group into one or more user groups based on the same criteria. The criteria could indicate ranges (e.g., age ranges, usage ranges, profile types, etc.). By dividing the control group and the deprivation group into the user groups with the same characteristics, a statistical comparison can be generated in order to assign a statistically significant value of recommending connections through the PYMK interface. In at least one embodiment, the user groups may be based on not only each user's level of engagement with the social networking system 200 but also based on other social networking system 200 usage and user profile information.

For example, the user groups could be based on the level of engagement of the user with the social networking system 200, their current number of connections (i.e., friends), number of hours the user has utilized the social networking system 200 in the last X number of days (e.g., last 30 days), etc. In some embodiments, the users could be grouped into groups such as L1_5, L6_10, L11_15, L16_20, L21_25, L26_29, L30, L1_5_FC_50_99, etc., where L1_5 identifies users who have accessed the social networking system 200 between one to five times in the last X days and L1_5_FC_50_99 identifies users who have not only accessed the social networking system 200 between once to five times in the last X days but also have between 50 to 99 connections (i.e., friends).

Before beginning the experiment to determine the statistical value of recommending connections through the PYMK unit, a set of initial conditions for various analytics (e.g., average initial connections, average initial engagement, etc.) in each of the user groups can be determined. In step 306, for each of the user groups in the control group, the friendship value computation engine 130 determines the average number of initial connections (i.e., friends) per user that a given user group had prior to the exposure to PYMK units. Further, for each of the user groups in the deprivation group, the friendship value computation engine 130 determines the average number of initial connections per user that a given user group had prior to the non-exposure to PYMK units. For example, users of the user group L1_5 of the control group could on average have 15 initial friends while users of the user group L1_5 of the deprivation group could also have on average about 15 initial friends.

In step 308, for each of the user groups in the control group, the friendship value computation engine 130 determines the average level of initial engagement per user that a given user group had prior to the exposure to PYMK units. Further, for each of the user groups in the deprivation group, the friendship value computation engine 130 determines the average level of initial engagement per user that the given user group had prior to the non-exposure to PYMK units. For example, in some embodiments, the friendship value computation engine 130 determines the initial engagement level of each user by determining the average number of days users at least accessed the social networking system 200 once in the last thirty days prior to the exposure/non-exposure to the PYMK units. So, for example, users of the user group L1_5 of the control group could on average have about 2.5 day-logins as their initial engagement level while users of the user group L1_5 of the deprivation group could also similarly have on average about 2.5 day-logins as their initial engagement level.

After the completion of the experiment to collect data for determining the statistical value of recommending connections through the PYMK unit, a set of final conditions for the various analytics (e.g., average initial connections, average initial engagement, etc.) in each of the user groups can be determined. In step 310, for example, the friendship value computation engine 130 determines, for each user group in the control group, the average number of final connections per user of a given user group had after the exposure to PYMK units for the X number of days. Further, for each of the user groups in the deprivation group, the friendship value computation engine 130 determines the average number of final connections per user that a given user group had after the non-exposure to PYMK units for the X number of days. For example, users of the user group L1_5 of the control group could on average have about thirty-five final friends while users of the user group L1_5 of the deprivation group could on average have about twenty-six final friends.

In addition to collecting the initial and final analytics, some embodiments determine a level of final engagement for both the control group and the deprivation group. For example, in step 312 the friendship value computation engine 130 determines the average level of final engagement of each user of a given user group had after the exposure to PYMK units for the X number of days. Further, for each of the user groups in the deprivation group, the friendship value computation engine 130 determines the average level of final engagement of each user of a given user group had after the non-exposure to PYMK units for the X number of days. The friendship value computation engine 130 can also determine the final engagement level of each user by determining the average number of days each user at least accessed the social networking system 200 once in the thirty day period after the exposure/non-exposure to the PYMK units. So, for example, users of the user group L1_5 of the control group could on average have about five day-logins as their final engagement level while users of the user group L1_5 of the deprivation group could have on average about four day-logins as their initial engagement level.

Now that the initial and final data has been collected, in step 314 the friendship value computation engine 130 determines the average change in the number of friends each user of a given user group had, the change being the difference between the average number of initial friends and final friends each user of the given user group had. For example, users of the user group L1_5 of the control group on average experienced a change of about twenty friends while users of the user group L1_5 of the deprivation group on average experienced a change of about eleven friends.

In step 316, for each of the user groups in the two primary groups, the friendship value computation engine 130 determines the average change in the level of engagement of each user of a given user group, the change being the difference between the average level of initial engagement and final engagement of each user of the given user group. For example, users of the user group L1_5 of the control group on average experienced a change of about 2.5 day-logins while users of the user group L1_5 of the deprivation group on average experienced a change of about 1.5 day-logins.

With the changes between the initial values and the final values computed, a comparison can be made between the control group and the deprivation group as illustrated in step 318 and step 320. In step 318, for each user group under the deprivation group, the friendship value computation engine 130 identifies the respective user group under the control group that had the same level of initial user engagement and determines the difference between their respective average change in the number of friends each user of the group had. For example, users of the user group L1_5 of the control group on average experienced a change of about twenty friends while users of the user group L1_5 of the deprivation group on average experienced a change of about eleven friends. Therefore, the difference between average change in the number of friends of the user group L1_5 of the control group and the user group L1_5 of the deprivation group is nine friends (i.e., 20−11=9 friends).

In step 320, for each user group under the deprivation group, the friendship value computation engine 130 identifies the respective user group under the control group that had the same level of initial user engagement and determines the difference between their respective average level of engagement of each user of the user group. For example, users of the user group L1_5 of the control group on average experienced a change of about 2.5 day-logins while users of the user group L1_5 of the deprivation group on average experienced a change of about 1.5 day-logins. Therefore, the difference between average change in the level of engagement of the user group L1_5 of the control group and the user group L1_5 of the deprivation group is 1 day-login (i.e., 2.5−1.5=1 day-login).

Based on the comparison of the data, in step 322, for each user group under the deprivation group, the friendship value computation engine 130 calculates a value of friendship to a user of the user group. The value of friendship can be computed in some embodiments as the determined difference in average level of engagement of each user of the user group had over the determined difference in average change in number of friends each user of the user group had. For example, the value of friendship to a user of the user group L1_5 of the deprivation group is equal to 1 day-login/9 friends=0.11 (i.e., user group L1_5 has a friendship value of 0.11 login increase per PYMK connection added).

The conversion prediction engine 150 predicts whether a user will act on the connection suggestion. In one embodiment, the conversion prediction engine 150 is a machine-learning model trained using a set of historical data. Historical data includes, but is not limited to, demographic data, behavioral data, and communications data of a user within the social networking system. For example, the conversion prediction engine 150 can use data associated with the user and each candidate user, such as the number of friends in common, the length of time two users have been friends, ratio of mutual friends to total friends, age, gender, country, total friends, time spent on the social networking system, the length of time the users have been associated with the social networking system, etc., to predict the likelihood of a connection between the user. In one embodiment, a training set is generated using historical data of users to whom previous suggestions were made, data about the users who were the subject of the suggestion, and whether the user acted on the suggestion.

In one embodiment, the conversion prediction engine 150 is trained using the training set data. Subsequently, the user and candidate user data is input to the conversion prediction engine 150. The conversion prediction engine 150 outputs the probability that a connection will result between each of the candidate users provided by the candidate set generator 110 and the user. In some embodiments, the conversion prediction engine 150 estimates the probability that a connection will result between a given candidate user and the user based on the respective user group the given candidate user and the user belong to. In one instance, the user groups could be defined similar to the user groups defined by the friendship value computation engine 130. The conversion prediction engine 150 subdivides the users into one or more user groups based on each user's level of engagement with the social networking system 200. In one instance, the level of engagement with the social networking system 200 is measured based on number of times the user has logged into the social networking system 200 in the last X number of days (e.g., last thirty days). In another instance, a user's level of engagement with the social networking system 200 can be measured by the average number of hours per day the user accessed content available through the social network over a given time period.

The conversion prediction engine 150 determines the respective user group the user and the given candidate user belong to. Based on their user groups, the conversion prediction engine 150 queries the action log 115 and retrieves the number of connection requests sent by the users of the user group the user belongs to the users of the user group the candidate user belongs. The conversion prediction engine 150 further queries the action log 115 and retrieves the number of those connection requests that were accepted by the users who belong to the candidate user's user group. In one instance, the retrieved information could be confined to a specific time frame.

The conversion prediction engine 150 determines the probability that a connection will result between the user and the given candidate user as the number of connection requests accepted by the users of the candidate user's user group over the number of connection requests sent from the user' user group to the candidate user's user group. For example, let user "A" have an engagement level of five day-logins for a 30 day period and let candidate user "B" have an engagement level of seventeen day-logins for a 30 day period. Based on the user groups identified by the friendship value computation engine 130, the user and the candidate user could be grouped into user group L1_5 and user group L16_20, where L1_5 identifies users who have accessed the social networking system 200 between once to five times in the last 30 days and L16_20 identifies users who have accessed the social networking system 200 between sixteen to twenty times in the last thirty days. The conversion prediction engine 150 queries the action log 115 and retrieves the social networking system 200 usage information such as the number of connection requests sent from users of user group L1_5 to users of user group L16_20 in a specific thirty day period (say 20,000 requests), the number of those connection requests accepted by users of the user group L16_20 within thirty days of receiving the request (say 1,500 requests were accepted), etc. Therefore, the probability that a connection will result between the user and the candidate user is 1,500/20,000=0.075 or 7.5% chance.

The scoring engine 170 generates a set of sending and receiving scores for various user groups within the social networking system by accessing the user profile store 125 and action log 115 within the social networking system data 100. In one embodiment, the scoring engine 170 groups the users of the social network into one or more user groups based on whether the users were shown candidate users to enable further connections between the users and the candidate users within a given period of time. The scoring engine 170 then generates a sending and receiving score for each of these user groups, where the sending and receiving score of a user of a given user group is based on the sending and receiving score of the user's user group.

Figure 4:
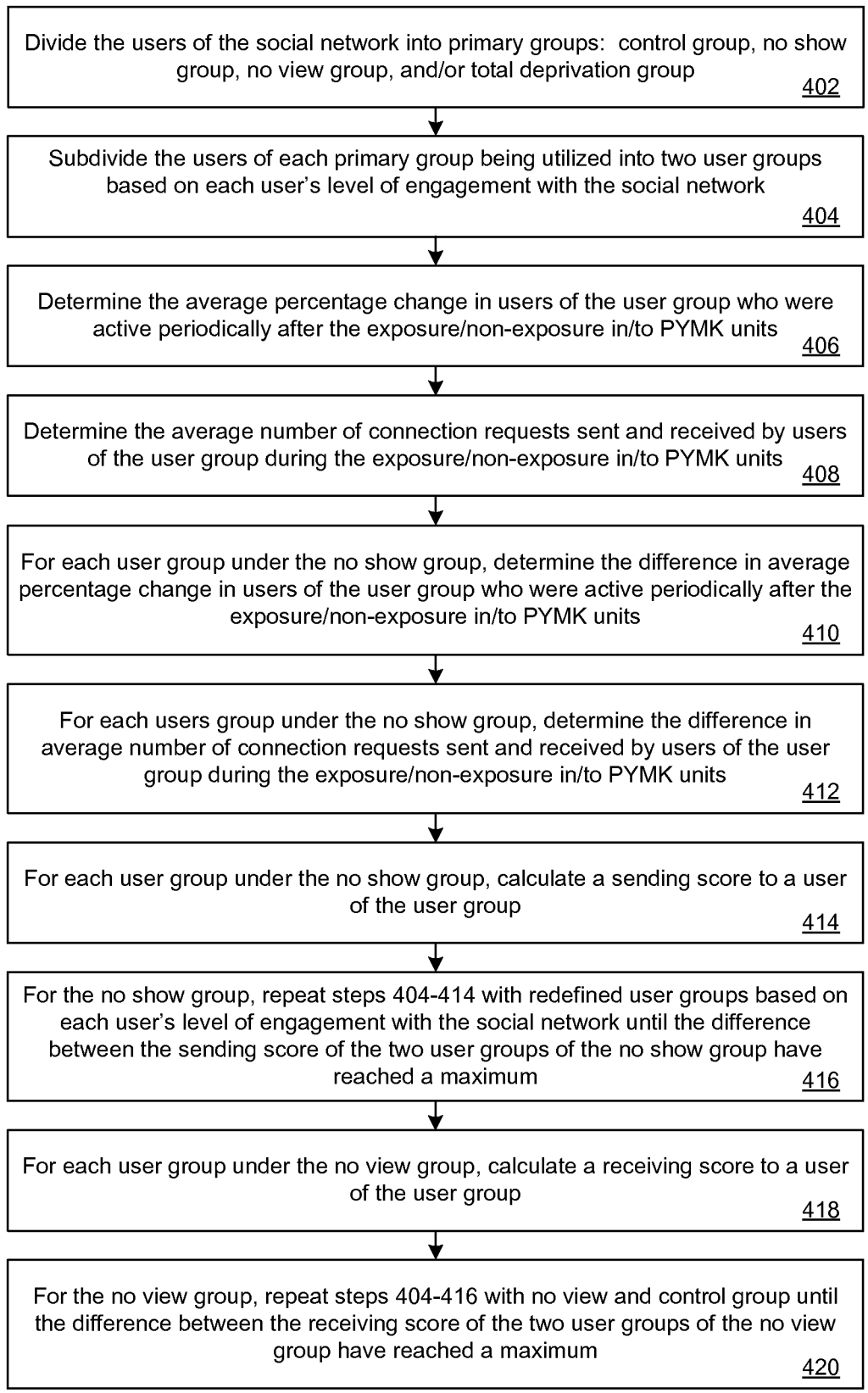
FIG. 4 is a flow chart of a process for computing a sending and receiving score of a given user of a social networking system, in accordance with an embodiment of the invention.

FIG. 4 describes one method used by the scoring engine 170 for determining the sending and receiving value for each of the user groups. As illustrated in step 402, the scoring engine 170 divides a subset of the users of the social network into primary groups. The primary groups can include a control group, a no show group, a no view group, and/or a total deprivation group. Data can be collected for these groups over a period of time. The data collected can then be compared and used to generate sending and receiving scores for other users in the user population. For example, in some cases scoring engine 170 may only divide the users into a control group, a no show group, and a no view group for generating scores.

The users of the control group are shown PYMK units. Additionally, the users of the control group can be viewed as candidate users in PYMK units that are shown to other users. On the other hand, the users of the no show group are not shown any PYMK units. However, the users in the no show group can be viewed as candidate users in PYMK units that are shown to other users. Further, users of the no view group are shown PYMK units but cannot be viewed as candidate users in PYMK units that are shown to other users. Finally, users in the total deprivation group are not shown PYMK units and cannot be viewed as candidate users in PYMK units show to other users.

In step 404, for each of the above primary groups being utilized, the scoring engine 170 further subdivides the users into two user groups based on each user's level of engagement with the social network. In one instance, a user's level of engagement is measured based on the user's number of initial connections and the total duration (i.e., tenure) the user has utilized the social network prior to the exposure/non-exposure in/to the PYMK units. For example, the users of the control group are divided into two groups L1_10_T0_2 and L11_T2, where user group L1_10_T0_2 includes all users who have one to ten connections or have been using the social networking system 200 for less than two years while user group L11_T3 represents the rest of the users who have at least eleven connections or have been using the social networking system 200 for at least two years. The users of the no view and no show are similarly divided into two user groups each based on each user's level of engagement.

With the primary groups being utilized divided into user groups, the scoring engine 170 determines the average percentage change in users of the user group who were active periodically after the exposure/non-exposure to PYMK units in step 406. In one instance, a user is identified as active monthly (i.e., month being the period of reference) if the user accesses the social network at least once within a 30-day period. For example, the scoring engine 170 accesses the action log 115 and retrieves usage information pertaining to the users of the two users groups L1_10_T0_2 and L11_T2 of the control group. The retrieved information includes the number of users of the user groups who were active monthly before and after the exposure/non-exposure in/to PYMK units.

For example, suppose that that user group L1_10_T0_2 had eight logins before the exposure/non-exposure in/to PYMK units and twelve logins after exposure/non-exposure in/to PYMK units. In addition, suppose the L11_T2 had fourteen logins before the exposure/non-exposure in/to PYMK units and nineteen logins after exposure/non-exposure in/to PYMK units. The percentage change in users of the user group L1_10_T0_2 who were active periodically after the exposure/non-exposure to PYMK units is 50% (i.e., (12−8)/8*100=50%). The percentage change in users of the user group L11_T2 who were active periodically after the exposure/non-exposure to PYMK units is 36% (i.e., (19−14)/14*100=36%).

In addition to determining the percent change in users, in step 408, the scoring engine 170 determines the average number of connection requests sent and received by users of the user group during the exposure/non-exposure in/to PYMK units. For example, the scoring engine 170 accesses the action log 115 and retrieves usage information pertaining to the users of the two users groups L1_10_T0_2 and L11_T2 of the control group. The retrieved information includes the number of connection requests sent and received by users of the user group during the exposure/non-exposure in/to PYMK units.

For example, suppose that user group L1_10_T0_2 had 1,000 connection requests sent and received for 100 users. As a result, the average number of connection requests sent and received per user of the L1_10_T0_2 user group would be ten. Similarly, if user group L11_T2 had 1,200 connection requests sent and received for 150 users, the average number of connection requests sent and received per user of the L11_T2 user group would be eight.

With the change in user and the average number of connection requests computed, a comparison between the primary groups can be performed in steps 410 and 412. In step 410, for each user group under the no show group, the scoring engine 170 identifies the respective user group under the control group that has the same level of user engagement and determines the difference between their respective average percentage change in users of the user group who were active monthly after the exposure/non-exposure in/to PYMK units. For example, suppose that the scoring engine 170 computed that the user group L1_10_T0_2 of the control group had a 50% change in users who were active monthly after the exposure/non-exposure in/to PYMK units. Further, suppose that the scoring engine 170 computes that the user group L1_10T0_2 of the no show group had a 25% change in users who were active monthly after the exposure/non-exposure in/to PYMK units. Therefore, the difference between their respective average percentage change is 25% (i.e., 50%−25%=25%). Similar difference value is computed for the other user group L11_T2 of the no show group.

In step 412, for each user group under the no show group, the scoring engine 170 identifies the respective user group under the control group that has the same level of user engagement and determines the difference between their respective total number of connection requests sent and received by users of the user group during the exposure/non-exposure in/to PYMK units. For example, suppose the scoring engine 170 computed that the user group L1_10_T0_2 of the control group had an average number of connection requests sent and received per user of ten. In addition, suppose the scoring engine 170 computed that the user group L1_10_T0_2 of the no show group had an average number of connection requests sent and received per user of eight. Therefore, the difference between their respective average number of connection is two (i.e., 10−8=2). Similar difference value is computed for the other user group L11_T2 of the no show group.

In step 414, for each user group under the no show group, the scoring engine 170 calculates a sending score to a user of the user group. In accordance with various embodiments, the value of sending score can be computed as the determined difference in average percentage change in users of the user group who were active monthly over the determined difference between the total number of connection requests sent and received for each user of the group. For example, suppose the scoring engine 170 computed that the user group L1_10_T0_2 of the no show group and the control group showed a difference of about two in average number of connection requests sent and received per user of the L1_10_T0_2 user group and a difference of about 25% in percentage change in users who were active monthly. Therefore, the sending score for user group L1_10_T0_2 is 12.5 (i.e., 25/2=12.5). Similar sending score is computed for the other user group L11_T2 of the no show group is computed as fifteen.

In step 416, for the no show group, the scoring engine 170 repeats steps 404-414 with different values for defining the two user groups based on each user's level of engagement with the social network until the difference between the sending score of the two user groups of the no show group are at their maximum. For example, the initial user groups of the no show group are L1_10_T0_2 and L11_T2 with a sending score of 12.5 and 15 respectively. Therefore, the difference between their sending scores is 2.5. The scoring engine 170 then divides the users of the control group and no show group into two new groups L1_20_T0_3 and L21_T3 each and repeats the steps 404-416 till the difference between the sending scores of the two groups of no show group has reached a maximum (relative to all other combinations of user connection and user tenure classification). Here, user group L1_20_T0_3 includes all users who have one to twenty connections or have been using the social networking system 200 for less than three years while user group L11_T3 represents the rest of the users who have at least twenty-one connections or have been on using the social networking system 200 for at least three years.

Scoring engine 170 repeats steps 404-416 with the no view user group (instead of the no show user group) and the control user group to determine the receiving score for the user groups of social networking system 200 in steps 418 and 420. Similarly, in some cases, scoring engine 170 repeats steps 404-416 with the total deprivation group and the control group to determine a total score indicating the impact of both showing the user as a candidate user in PYMK units to other users and the user being shown PYMK units.

FIG. 5 illustrates a list of sending and receiving scores that were derived by the scoring engine 170 for various user groups (e.g., classified based on user's number of connections and tenure) of the social networking system 200. In the data illustrated in FIG. 5, the users of the user group who have less than or equal to six connections (i.e., friendship connections ("fc")) have a sending score of forty-four while users of the user group who have a tenure of less than or equal to one year and have at least thirty connections have a sending score of 1.7. Similarly, users of the user group with less than or equal to three connections have a receiving score of forty-nine while users of the user group with less than or equal to sixty connections but greater than twenty three connections have a receiving score of twelve. The scoring engine 170 provides the value computation engine 190 with the sending and receiving scores of the various user groups of the social networking system 200.

The value computation engine 190 receives the list of candidate users, connection probabilities between the user and the various candidate users, the set of friendship values, sending scores, and receiving scores of the various user groups and outputs ranking of the candidate users based on any friendship values, sending scores, receiving scores, or any combination of scores of the candidate users. The output of the value computation engine 190 is stored in a candidate ranking database 195, where the candidate users provided to a user are ranked according to either their friendship value score (with reference to their friendship with the user), their sending score, their receiving score, or any combination of scores.

Figure 6:
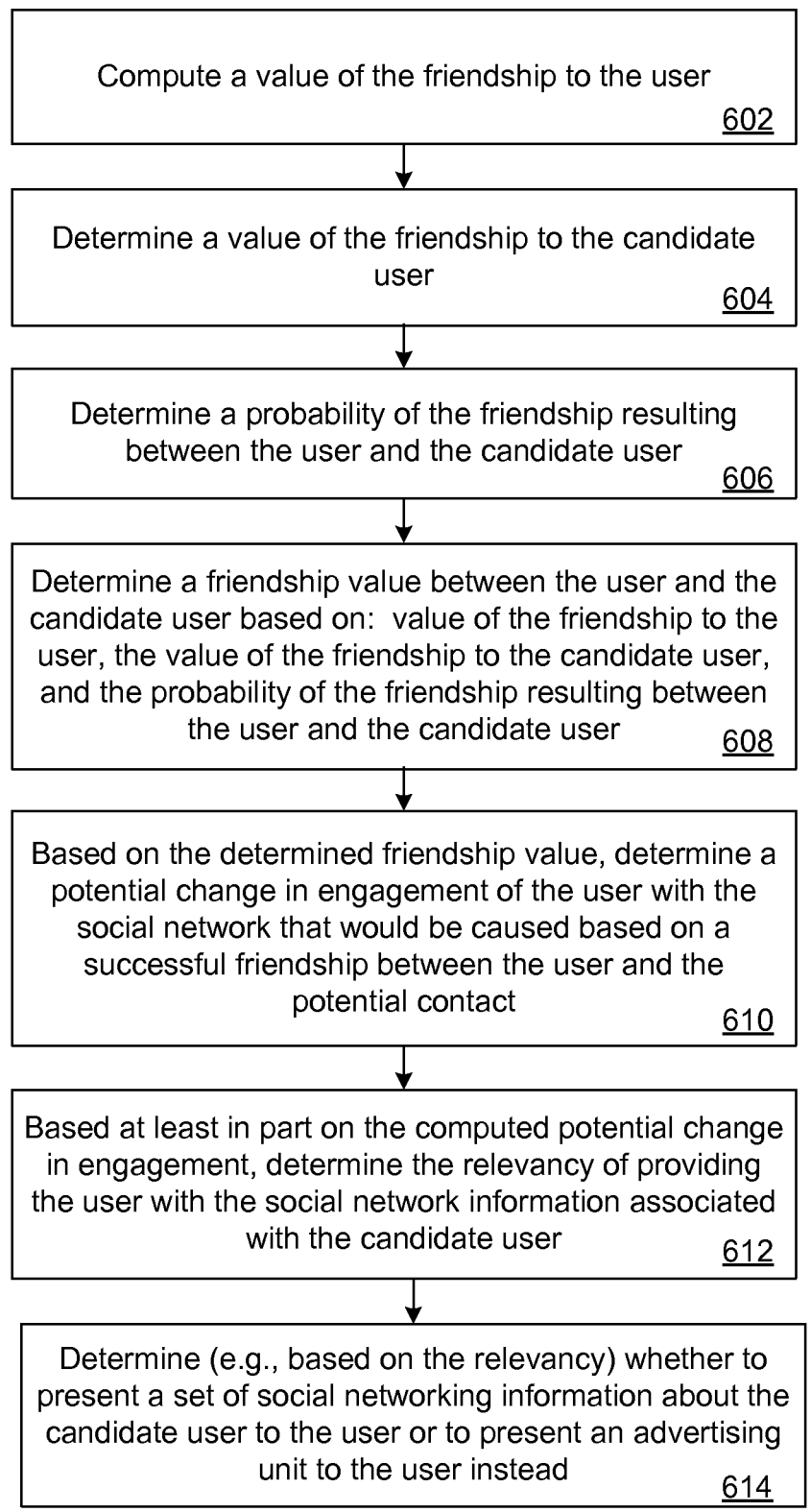
FIG. 6 is a flow chart of a process for computing the relevancy of providing contact information of a candidate user to a given user of a social networking system, in accordance with an embodiment of the invention.

In accordance with one embodiment, the value computation engine 190 utilizes the method described in FIG. 6 to determine the friendship value between the user and a candidate user. In step 602, the value computation engine 190 determines the value of a friendship to the user by utilizing the friendship values of the various user groups.

The value computation engine 190 determines, or matches the user to, the user group based on the user's level of engagement (similar to step 304) with the social networking system. Here, as in step 304, the level of engagement with the social networking system 200 can be measured based on number of times the user has logged into the social networking system 200 in the last X number of days (e.g., last 30 days).

Based on the user group which has an engagement level similar to that of the user, the value computation engine 190 determines the value of friendship associated with the user group and assigns the user group's value of friendship as the value of the connection to the user. For example, the users could be grouped into groups such as L1_5, L6_10, L11_15, L16_20, L21_25, L26_29, L30, L1_5_FC_50_99, etc., where L1_5 identifies users who have accessed the social networking system 200 between once to five times in the last X days and L1_5_FC_50_99 identifies users who have not only accessed the social networking system 200 between once to five times in the last X days but also have between fifty and ninety-nine connections (i.e., friendships). So, if the user was identified to belong to user group L1_5 and the group L1_5 has a value of friendship score of 0.05, then the user is assigned a value of friendship score of 0.05.

In step 604, similar to step 602, the value computation engine 190 determines the value of a friendship to a candidate user by utilizing the friendship values of the various user groups. In step 606, the value computation engine 190 determines the probability of friendship between the user and the candidate user from the list of probabilities (between the user and the various candidate users) received from the conversion prediction engine 150. In some embodiments, the steps 602-606 may be performed in parallel or in a different order than shown in FIG. 6.

In step 608, the value computation engine 190 can determine the friendship value between the user and a candidate user based on the following equation:

$$\text{Value of friendship between user } A \text{ and user } B = (\text{Value of friendship to } A + \text{Value of friendship to } B) * \text{probability of friendship happening between } A \text{ and } B \quad (1)$$

For example, if the value of friendship score to the user was 0.05, the value of friendship score to the candidate user was 0.02, and the probability of friendship between the user and the candidate user was 7.5%, then the value of a friendship between the user and the candidate user would be 0.00525 (i.e., (0.05+0.02)*0.075=0.00525).

In step 610, the value computation engine 190 utilizes the determined friendship value to determine the potential change in engagement of the user with the social networking system 200 that would result from a successful friendship between the user and the candidate user. In one embodiment, engagement of the user with the social networking system 200 is measured based on the number of times the user logs into the social network system in a specified timeframe. For example, engagement of the user with the social network system is based on the number of days the user logs into the social networking system at least once within a thirty day time period. To determine the potential change in engagement of the user, the value computation engine 190 determines the present engagement of the user to whom the candidate user is presented. The value computation engine 190 also determines the engagement of the user based on assumption of a successful connection between the user and the candidate user.

In one instance, the value computation engine 190 utilizes the friendship value to determine a future engagement value of the user with the social networking system 200 from a successful connection with the candidate user. In some embodiments, the future engagement level of the user can be determined based on the friendship value. For instance, the future engagement level of the user corresponding to a given friendship value can be based on a function f(x) (where x is the friendship value), where the function is determined based on user data, such as engagement level of users from various user groups before and after a connection with other users of the social networking system 200, from the action log 115.

For example, f(x) could be a simple linear function which maps a given friendship value to a corresponding user engagement level with the social networking system 200. The value computation engine 190 determines the change in engagement of the user with the social networking system 200 that would result from a successful friendship between the user and the candidate user as the difference between the user's present engagement value and the future engagement value. For example, the user's present engagement value could be 5 day-logins (in a thirty day period), while the friendship value of 10 (between the user and the candidate user) corresponds to a future engagement value of 8 day-logins (in a 30 day period). The potential change in engagement of the user is, therefore, 3 day-logins (i.e., 8−5=3 day-logins) from a successful connection with the candidate user.

In step 612, the value computation engine 190 utilizes the potential change in engagement level of the user to determine the relevancy of providing the user with contact information associated with the candidate user. In one instance, the value computation engine 190 determines that the relevancy of providing the user with the contact information associated with the candidate user based at least in part on the potential change in engagement being greater than a certain threshold value. For example, the threshold value could be set at two day-logins. So, the candidate user with whom the user experiences a potential change in engagement of three day-logins from a successful connection is provided as a candidate user to the user. In one instance, the value computation engine 190 outputs a ranking for one or more candidate user to be provided to the user based on each candidate user's change in engagement value. In another instance, the value computation engine 190 outputs the ranking for one or more candidate user to be provided to the user based on each candidate user's friendship value.

In step 614, a determination can be made as whether to show social networking information (e.g., profile picture, e-mail address, link to an online profile, etc.) to the user or to show an advertising unit to the user. This determination can be based on, for example, the relevancy, friendship score, sending score, receiving score or some combination of the scores as determined by value computation engine 190. In some instances, the advertising unit can have an assigned value and only when the relevancy or potential change in engagement is above the assigned value is the social networking information associated with the candidate user shown to the user instead of the advertising unit.

In one embodiment, the value computation engine 190 determines the sending and receiving score of each provided candidate user based on the sending and receiving scores of the various user groups received from the scoring engine 170. FIG. 5 illustrates a list of sending and receiving score that were derived by the scoring engine 170 for various user groups (classified based on user's number of connections and tenure) of the social networking system 200. In one instance, the value computation engine 190 determines the sending and receiving score of each provided candidate user based on their number of connections and tenure at the social networking system 200. Of course, other user associated parameters, such as hobbies, interests, educational background, etc. can be used to classify users under user groups and identify their sending and receiving scores using a related sending and receiving user group scores.

For example, in FIG. 5, users of the user group who have less than or equal to six connections (i.e. friendship connections ("fc")) have a sending score of 44 while users of the user group who have a tenure of less than or equal to one year and have at least 30 connections have a sending score of 1.7. Similarly, users of the user group with less than or equal to three connections have a receiving score of 49 while users of the user group with less than or equal to sixty connections but greater than twenty three connections have a receiving score of 12. The value computation engine 190 determines the sending and receiving score of each provided candidate user based on the sending and receiving scores of the various user groups.

Here, the receiving score of the candidate user reflects the value to the candidate user in receiving a connection request from a user, where connections formed between candidate users with high receiving scores potentially increases both the user's and candidate user's continued active utilization of the social networking system. Similarly, the sending score of the user reflects the value to the user in sending a connection request to the candidate users, where connections formed by a user with high sending scores potentially increases both the user's and the candidate users' continued active utilization of the social networking system.

In one embodiment, the value computation engine 190 generates a ranking for one or more candidate users that can be provided to the user based on each candidate user's receiving score. The receiving score associated with each candidate user shows the relative importance (to each candidate user) of receiving a connection request from the user. For example, in FIG. 5, a candidate user with a receiving score of forty-five is fifteen times more likely to benefit from a potential connection (stemming from a connection request) than a candidate user with a receiving score of three (i.e., 45/3=15). The value computation engine 190 outputs a ranking for one or more candidate users to be provided to the user according to each candidate user's relative ranking based on their receiving score.

In another instance, the value computation engine 190 outputs a ranking based on each candidate user's absolute receiving score. Similarly, in another instance, the value computation engine 190 outputs a ranking for one or more candidate users to be provided to the user according to each candidate user's relative ranking based on their sending score. In another instance, the value computation engine 190 outputs a ranking based on each candidate user's absolute sending score, where the sending score captures the importance of a candidate user sending a connection request (and potentially forming a connection from one of these connection requests).

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Figure 7:
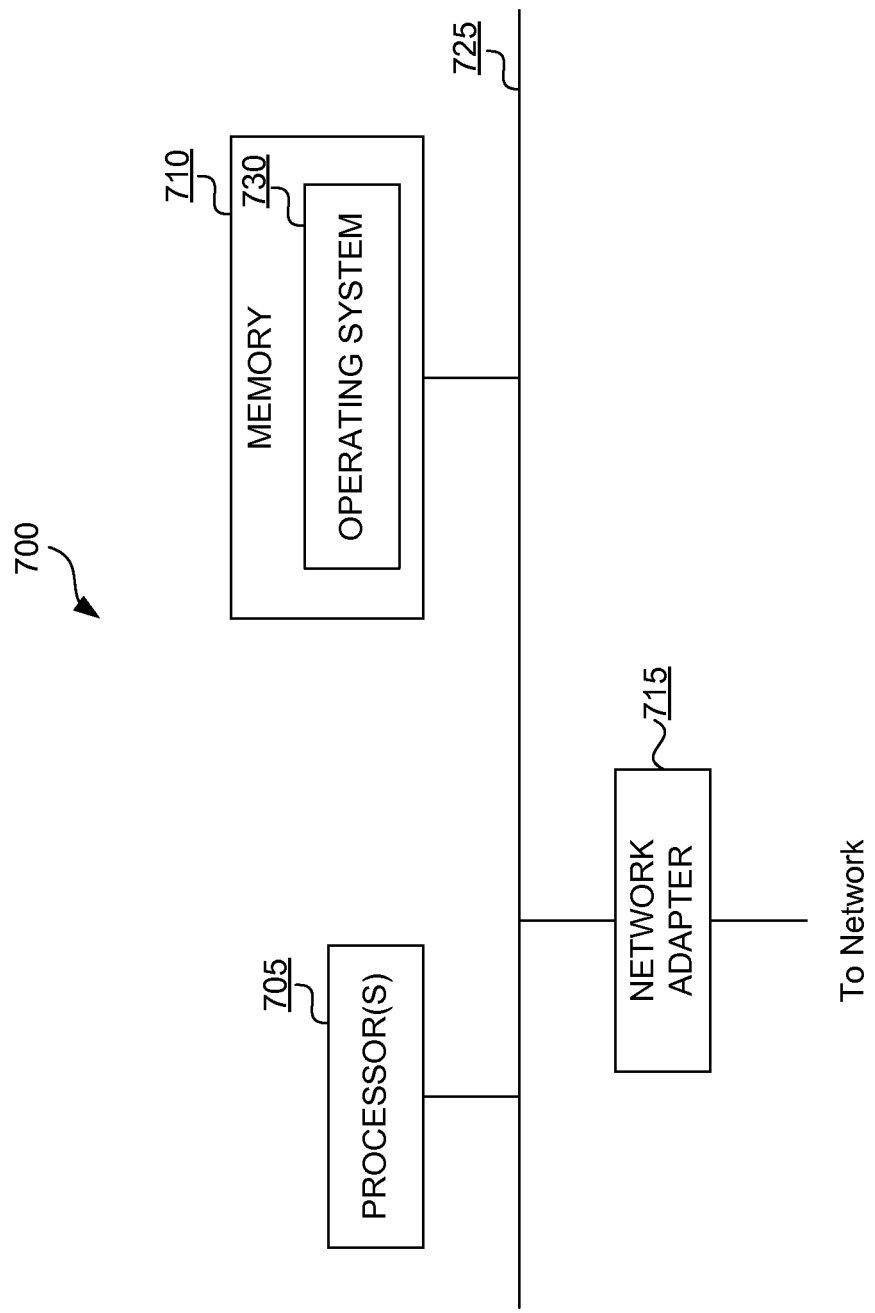
FIG. 7 is a high-level block diagram showing an example of the architecture for a computer system.

FIG. 7 is a high-level block diagram showing an example of the architecture for a computer system 700 that can be utilized to implement a social networking system (e.g., 200 from FIG. 2), a web server (e.g., 230 from FIG. 2), etc. In FIG. 7, the computer system 700 includes one or more processors 705 and memory 710 connected via an interconnect 725. The interconnect 725 is an abstraction that represents any one or more separate physical buses, point to point connections, or both connected by appropriate bridges, adapters, or controllers. The interconnect 725, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C)

bus, or an Institute of Electrical and Electronics Engineers (IEEE) standard 674 bus, sometimes referred to as "Firewire".

The processor(s) 705 may include central processing units (CPUs) to control the overall operation of, for example, the host computer. In certain embodiments, the processor(s) 705 accomplish this by executing software or firmware stored in memory 710. The processor(s) 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 710 is or includes the main memory of the computer system. The memory 710 represents any form of random access memory (RAM), read-only memory (ROM), flash memory (as discussed above), or the like, or a combination of such devices. In use, the memory 710 may contain, among other things, an operating system 730 and/or a set of machine instructions which, when executed by processor 705, causes the processor 705 to perform operations to implement embodiments of the present invention.

Also connected to the processor(s) 705 through the interconnect 725 is a network adapter 715. The network adapter 715 provides the computer system 700 with the ability to communicate with remote devices, such as the storage clients, and/or other storage servers, and may be, for example, an Ethernet adapter or Fiber Channel adapter.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

What is claimed is:

1. A computer-implemented method comprising:
    receiving, with a machine learning system, historical data regarding a user of a social networking system and a candidate user of the social networking system and a training set of data regarding users to whom previous suggestions were made, data about the users who were the subject of the suggestions, and whether the users acted on the suggestions;
    training the machine learning system using the training set of data to improve estimates made by the machine learning system of a probability that a user will act upon a suggestion made by the machine learning system;
    determining, by a computer, a friendship value between the user and the candidate user in the social networking system, the friendship value computed as a function of one or more of: a value of a friendship to the user, a value of the friendship to the candidate user, or a probability of the friendship resulting between the user and the candidate user;
    determining, by the trained machine learning system, a potential change in engagement of the user with the social networking system that would be caused based on a successful friendship between the user and the candidate user, the change in the engagement determined at least in part based on the computed friendship value; and
    providing, by the computer, the user with social network information associated with the candidate user based at least in part on the determined potential change in engagement of the user with the social networking system,
    wherein the friendship value to the user is based at least in part on a group value of a user group the user belongs to, wherein the user group the user belongs to is determined by the computer based on one or more of:
a number of times the user logs into the social networking system in a specified timeframe;
a duration of the day during which the user logs into the social networking system; or
a type of computing device that the user primarily uses for logging into the social networking system,
wherein the group value of the user group is determined, by the computer, as a function of one or more of:
an average change in engagement of one or more users of the user group, the average change in engagement based on providing the one or more users information regarding one or more second candidate users, or
a change in number of friends associated with the one or more users of the user group, the change in number of friends based on providing the one or more users information regarding the one or more second candidate users,
wherein the probability of the friendship resulting between the user and the candidate user is determined by the trained machine learning system based on:
determining, by the computer, a number of friendship requests sent by one or more users of the user group to one or more users of a second user group corresponding to the candidate user, and
determining, by the computer, a number of friendship requests accepted by the one or more users of the second user group,
wherein the engagement of the user with the social networking system is measured, by the computer, by an amount of time spent by the user accessing content within the social networking system.

2. The method of claim 1, further comprising determining, by the computer, a relevancy of providing the user with social network information associated with the candidate user based at least in part on the determined potential change in engagement of the user with the social networking system.

3. The method of claim 2, further comprising determining, by the computer, based on the relevancy, whether to show the social network information associated with the candidate user to the user.

4. The method of claim 2, further comprising determining, by the computer, based on the relevancy, whether to show an advertising unit to the user instead of the social network information associated with the candidate user, wherein determining, by the computer, whether to show the advertising unit instead of the social network information associated with the candidate user is based at least in part on determining whether the potential change in engagement is greater than an advertising value.

5. The method of claim 1, further comprising determining, by the computer, to show the user the social network information associated with the candidate user instead of an advertising unit, wherein the determining to show the user the social network information associated with the candidate user is based at least in part on the difference between the current engagement level of the user with the social networking system and a projected engagement level of the user with the social networking system being greater than an advertising value associated with the advertising unit.

6. The method of claim 5, wherein the projected engagement level of the user with the social networking system is determined, by the computer, based on amounts of time spent by the user accessing content within the social networking system.

7. The method of claim 1, wherein the candidate user is selected by the computer from a target list of one or more candidate users, the one or more candidate users chosen by the computer based on a potential strength of connection of each of the one or more candidate users to the user, and the potential strength computed as a function of one or more commonalties between the user and a particular candidate user.

8. A system comprising:
a processor;
a memory configured to store a set of instructions, which when executed by the processor cause the system to perform a method, the method including:
receiving at a machine learning system historical data regarding a user of a social networking system and a candidate user of the social networking system and a training set of data regarding users to whom previous suggestions were made, data about the users who were the subject of the suggestions, and whether the users acted on the suggestions;
training the machine learning system using the training set of data to improve estimates made by the machine learning system of a probability that a user will act upon a suggestion made by the machine learning system;
determining a friendship value between the user and the candidate user in the social networking system, the friendship value computed as a function of one or more of: a value of the friendship to the user, a value of the friendship to the candidate user, or a probability of the friendship resulting between the user and the candidate user;
causing the machine learning system to determine a potential change in engagement of the user with the social networking system that would be caused by a successful friendship between the user and the candidate user, the change in the engagement determined at least in part based on the computed friendship value; and
providing the user with social network information associated with the candidate user based at least in part on the determined potential change in engagement of the user with the social networking system,
wherein the friendship value to the user is based at least in part on a group value of a user group the user belongs to,
wherein the user group the user belongs to is determined based on one or more of:
a number of times the user logs into the social networking system in a specified timeframe;
a duration of the day during which the user logs into the social networking system; or
a type of computing device that the user primarily uses for logging into the social networking system,
wherein the group value of the user group is determined as a function of one or more of:
an average change in engagement of one or more users of the user group, the average change in engagement based on providing the one or more users information regarding one or more second candidate users, or a change in number of friends associated with the one or more users of the user group, the change in number of friends based on providing the one or more users information regarding the one or more second candidate users, wherein the probability of the friendship resulting between the user and the candidate user is determined by the trained machine learning system based on:

determining a number of friendship requests sent by one or more users of the user group to one or more users of a second user group corresponding to the candidate user, and determining a number of friendship requests accepted by the one or more users of the second user group, wherein the engagement of the user with the social networking system is measured by an amount of time spent by the user accessing content within the social networking system.

9. The system of claim 8, wherein the method further includes determining a relevancy of providing the user with social network information associated with the candidate user based at least in part on the determined potential change in engagement of the user with the social networking system.

10. The system of claim 8, wherein the method further includes determining, based on the determined potential change in engagement of the user with the social networking system and the projected engagement of the user with the social networking system being greater than a given threshold value, whether to present to the user an advertising unit or to present to the user the social network information associated with the candidate user.

11. A non-transitory computer-readable storage medium storing instructions that, when executed by a computing system, cause the computing system to perform operations comprising:

causing a machine learning system to receive historical data regarding a user of a social networking system and a candidate user of the social networking system and a training set of data regarding users to whom previous suggestions were made, data about the users who were the subject of the suggestions, and whether the users acted on the suggestions;

causing the machine learning system to be trained using the training set of data to improve estimates made by the machine learning system of a probability that a user will act upon a suggestion made by the machine learning system;

determining a friendship value between the user and the candidate user in the social networking system, the friendship value computed as a function of one or more of: a value of a friendship to the user, a value of the friendship to the candidate user, or a probability of the friendship resulting between the user and the candidate user;

causing the machine learning system to determine a potential change in engagement of the user with the social networking system that would be caused by a successful friendship between the user and the candidate user, the change in the engagement determined at least in part based on the computed friendship value; and providing the user with social network information associated with the candidate user based at least in part on the determined potential change in engagement of the user with the social networking system, wherein the friendship value to the user is based at least in part on a group value of a user group the user belongs to, wherein the user group the user belongs to is determined based on one or more of:

a number of times the user logs into the social networking system in a specified timeframe;

a duration of the day during which the user logs into the social networking system; or a type of computing device that the user primarily uses for logging into the social networking system, wherein the group value of the user group is determined as a function of one or more of:

an average change in engagement of one or more users of the user group, the average change in engagement based on providing the one or more users information regarding one or more second candidate users, or a change in number of friends associated with the one or more users of the user group, the change in number of friends based on providing the one or more users information regarding the one or more second candidate users, wherein the probability of the friendship resulting between the user and the candidate user is determined by the trained machine learning system based on:

determining a number of friendship requests sent by one or more users of the user group to one or more users of a second user group corresponding to the candidate user, and determining a number of friendship requests accepted by the one or more users of the second user group, wherein the engagement of the user with the social networking system is measured by an amount of time spent by the user accessing content within the social networking system.

12. The method of claim 1, wherein the potential change in engagement of the user with the social networking system is measured based on activities on the social networking system including one or more of: user logins, page views, posts, comments, or any combination thereof.

13. The method of claim 2, wherein the social network information associated with the candidate user comprises one or more of:

a picture of the candidate user;

an email address of the candidate user; or a social network link to the candidate user.

14. The method of claim 1, further comprising:

determining, by the computer, a sending score for the user, the sending score based on:

the user group the user belongs to; and a group-sending-score associated with the user group, wherein the group-sending-score is a function of a change in a number of users of the user group who utilize the social networking system for at least a specified number of times within a given period of time; and determining, by the computer, a relevancy of providing the user with information regarding the candidate user based at least in part on the sending score for the user.

15. The method of claim 14, wherein the change in the number of users is determined, by the computer, based on:

providing the one or more users of the user group information regarding one or more second candidate users over a period of time; and not providing the one or more users of the user group as candidate users to users of one or more other user groups during the period of time.

16. The method of claim 14, wherein the group-sending-score of the user group is further determined, by the computer, as a function of an average number of friendship requests sent and received by one or more users of the user group, the average number of friendship requests sent and received based on:
- providing the one or more users of the user group information regarding the one or more second candidate users during a period of time; and
- not providing the one or more users of the user group as candidate users to users of the one or more other user groups during the first period of time.

17. The method of claim 1, further comprising:
- determining, by the computer, a receiving score for the user of the social networking system, the receiving score based on:
- a user group the user belongs to, wherein determination of the user group of the user is based at least in part on a number of friends of the user and a number of years the user has utilized the social networking system; and
- a group-receiving-score associated with the user group, the group-receiving-score determined as a function of a change in a number of users of the user group who utilize the social networking system for a specified number of times within a given period; and
- determining, by the computer, a relevancy of providing the user as a candidate user to another user of the social networking system based at least in part on the receiving score for the user.

* * * * *